(12) United States Patent
Nagahama et al.

(10) Patent No.: US 10,994,336 B2
(45) Date of Patent: May 4, 2021

(54) QUALITY ESTIMATION DEVICE FOR ADDITIVE PRODUCT

(71) Applicant: JTEKT CORPORATION, Osaka (JP)

(72) Inventors: Takaya Nagahama, Obu (JP);
Hiroyuki Hoshino, Chita-gun (JP);
Takashi Mizoguchi, Kariya (JP);
Makoto Tano, Obu (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/892,350

(22) Filed: Jun. 4, 2020

(65) Prior Publication Data
US 2020/0406358 A1 Dec. 31, 2020

(30) Foreign Application Priority Data
Jun. 25, 2019 (JP) .............................. JP2019-117146

(51) Int. Cl.
| | |
|---|---|
| B29C 67/00 | (2017.01) |
| B22F 10/20 | (2021.01) |
| G01N 9/36 | (2006.01) |
| B33Y 50/02 | (2015.01) |
| B33Y 30/00 | (2015.01) |
| B22F 10/30 | (2021.01) |

(52) U.S. Cl.
CPC .............. *B22F 10/20* (2021.01); *B33Y 30/00* (2014.12); *B33Y 50/02* (2014.12); *G01N 9/36* (2013.01); *B22F 10/30* (2021.01)

(58) Field of Classification Search
CPC ....... B33Y 10/00; B33Y 30/00; B29C 64/286; B29C 64/245; B29C 64/264; B29C 64/232; B29C 64/24; B29C 64/214; B29C 64/255; B22F 3/105
See application file for complete search history.

(56) References Cited

U.S. PATENT DOCUMENTS

| | | | |
|---|---|---|---|
| 10,144,176 B1* | 12/2018 | Buller | .................... B33Y 30/00 |
| 2017/0120376 A1 | 5/2017 | Cheverton et al. | |
| 2018/0104898 A1* | 4/2018 | Lameris | .................. B29C 64/20 |
| 2018/0250744 A1* | 9/2018 | Symeonidis | ............. B22F 3/11 |
| 2019/0255654 A1* | 8/2019 | Beckett | .................. B33Y 10/00 |
| 2019/0299536 A1* | 10/2019 | Putman | .................. B33Y 10/00 |

FOREIGN PATENT DOCUMENTS

JP          6374934 B2     8/2018

* cited by examiner

*Primary Examiner* — Joseph S Del Sole
*Assistant Examiner* — Thu Khanh T Nguyen
(74) *Attorney, Agent, or Firm* — Oblon, McClelland, Maier & Neustadt, L.L.P.

(57) ABSTRACT

A quality estimation device for an additive product includes an imaging device configured to illuminate a region including a molding surface during manufacturing of the additive product and image the region, when manufacturing the additive product at a molding position by irradiating with a light beam and a material powder melting and solidifying, a luminance acquisition unit acquires a luminance obtained by quantifying a brightness of a light reflected by at least the molding surface of the region in an image in which the imaging device images the region, and a molding density estimation unit estimates a molding density indicating a density of the material powder in a solidified state after melting based on the luminance of the molding surface acquired by the luminance acquisition unit. The material powder is supplied to the molding position.

15 Claims, 9 Drawing Sheets

QUALITY ESTIMATION DEVICE FOR ADDITIVE PRODUCT

CROSS REFERENCE TO RELATED APPLICATIONS

This application claims priority from Japanese Patent Application No. 2019-117146 filed on Jun. 25, 2019, the entire contents of which are incorporated herein by reference.

BACKGROUND OF THE INVENTION

Field of the Invention

The present invention relates to a quality estimation device for an additive product.

Description of Related Art

In a related art, there are a powder bed fusion system, a directed energy deposition system and the like in additive manufacturing. The powder bed fusion system performs additive manufacturing by irradiating a flat spread powder with a light beam (a laser beam, an electron beam, or the like). The powder bed fusion system includes selective laser melting (SLM), electron beam melting (EBM), and the like. The directed energy deposition system performs additive manufacturing by controlling emission of a light beam and a position of a head that discharges a powder material. The directed energy deposition system includes laser metal deposition (LMD), direct metal printing (DMP), and the like.

With respect to additive manufacturing, in a related art, for example, an additive manufacturing system including an imaging device and a method of operating such a system (hereinafter, referred to as a "related-art additive manufacturing system and the like") have been known which are disclosed in Japanese Patent No. 6374934. The related-art additive manufacturing system and the like include a camera disposed with respect to a surface and configured to generate an image of at least a portion of a melt path, and a processor for processing the image.

In an additive manufacturing system of a related art, a plurality of images are cumulatively acquired at regular intervals, and the processor detects a light intensity in the plurality of images. Accordingly, in the related-art additive manufacturing system and the like, a defect in a molten pool can be detected based on the intensity of the light emitted by the molten pool on the surface.

[Patent Literature 1] JP 6374934 B2

With respect to an additive product additively manufactured, when an internal defect such as a void exists inside the additive product, strength thereof is reduced. Therefore, from the viewpoint of maintaining quality, it is necessary to perform, for example, a destructive inspection, or a non-destructive inspection by X-ray CT scanning as to whether an internal defect exists in the additive product. However, in a case where the destructive inspection is performed, it is not possible to ship an additive product that has been destroyed accompanying the inspection even though it is manufactured with a long time. In a case where the non-destructive inspection is performed, a region that is possible for transmission imaging is small in a current state, and it is necessary to consider a result of the non-destructive inspection on a test piece produced at the same time as the additive product as a result of the non-destructive inspection on the additive product.

SUMMARY

One or more embodiments provide a quality estimation device for an additive product capable of detecting an internal defect of an additive product in a non-destructive manner.

In an aspect (1), a quality estimation device for an additive product includes an imaging device configured to illuminate a region including a molding surface during manufacturing of the additive product and image the region, when manufacturing the additive product at a molding position by irradiating with a light beam and a material powder melting and solidifying, a luminance acquisition unit acquires a luminance obtained by quantifying a brightness of a light reflected by at least the molding surface of the region in an image in which the imaging device images the region, and a molding density estimation unit estimates a molding density indicating a density of the material powder in a solidified state after melting based on the luminance of the molding surface acquired by the luminance acquisition unit. The material powder is supplied to the molding position.

According to the aspect (1), during manufacturing of an additive product, a molding density can be estimated based on luminance reflected by a molding surface. Presence or absence of an internal defect of the additive product can be determined based on the molding density estimated during the manufacturing. Therefore, the internal defect of the additively manufactured additive product can be easily detected by a non-destructive inspection.

DETAILED DESCRIPTION (1. Configuration of Additive Manufacturing Device 1)

Figure 1:
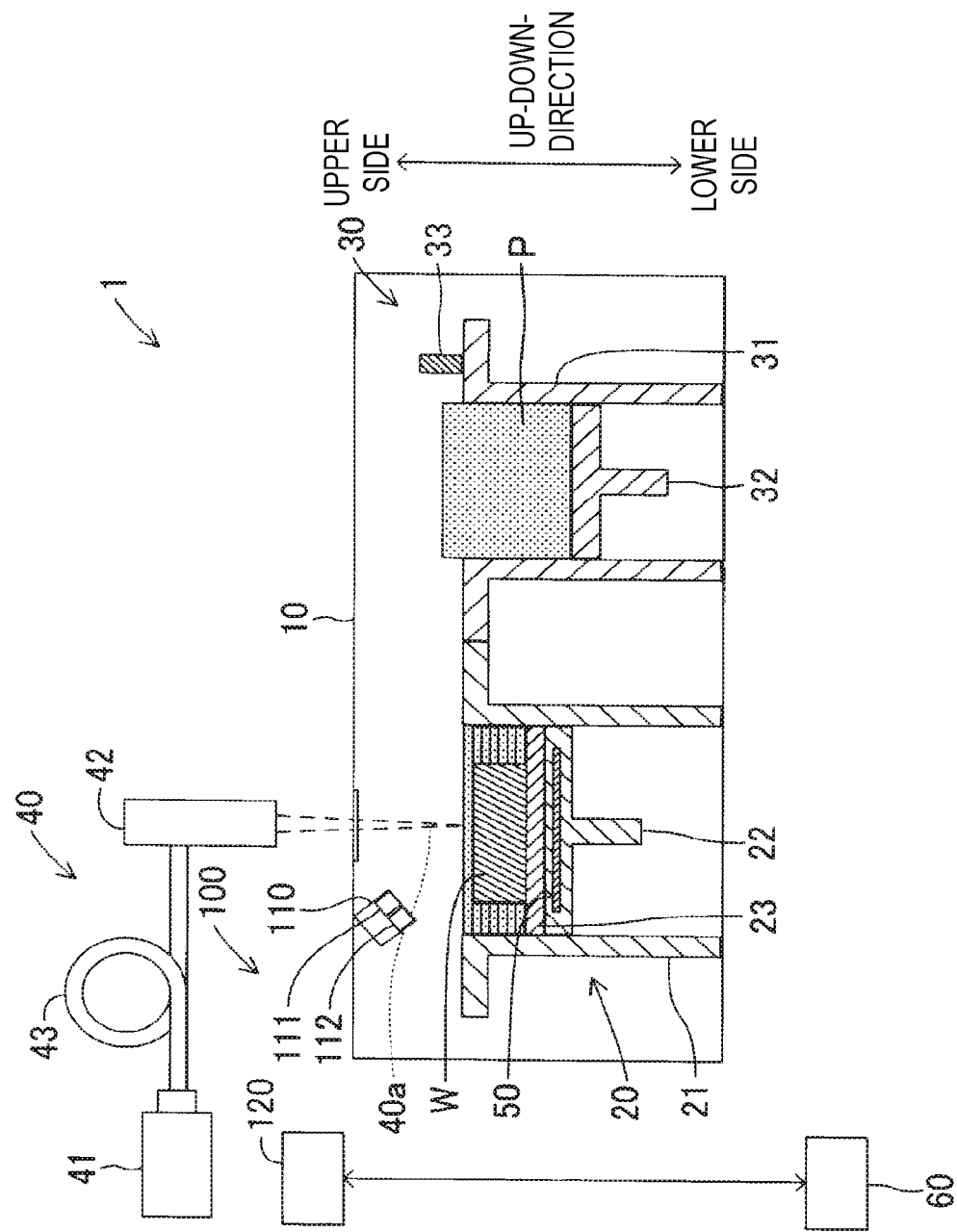
FIG. 1 is a diagram illustrating an additive manufacturing device.

A configuration of an additive manufacturing device 1 will be described with reference to the drawings. The additive manufacturing device 1 is, for example, a powder bed fusion system, and employs an SLM system. As illustrated in FIG. 1, the additive manufacturing device 1 is a device that manufactures an additive product W by repeating irradiating a metal powder P, which serves as a powder material arranged (deposited) in a layered manner, with a light beam.

Here, examples of the light beam include a laser beam and an electron beam, and additionally include various beams capable of melting the metal powder P. For the laser beam, various lasers can be applied, for example, a fiber laser, a $CO_2$ laser (far infrared laser), and a semiconductor laser, and the laser is appropriately determined according to a target metal powder P (for example, aluminum, stainless steel, titanium, maraging steel, and alloy tool steel).

As illustrated in FIG. 1, the additive manufacturing device 1 includes a chamber 10, a molded object support device 20, a powder supply device 30, a light beam irradiation device 40, a heating device 50, and a control device 60. Further, as will be described below, the additive manufacturing device 1 includes a quality estimation device 100 of the additive product W, which includes an imaging device 110 and a control device 120.

The chamber 10 is configured such that air inside is replaceable with an inert gas such as helium (He), nitrogen ($N_2$), and argon (Ar). The chamber 10 may have a configuration in which an inside thereof can be depressurized instead of being replaced with an inert gas.

The molded object support device 20 is provided inside the chamber 10, and is configured with a support member for molding (additively manufacturing) the additive product W. The molded object support device 20 includes a molding container 21, an elevation table 22, and a base 23. The molding container 21 has an opening on an upper side and an inner wall surface parallel to an axis in an up-down direction. The elevation table 22 is provided so as to be capable of moving up and down in the up-down direction along the inner wall surface inside the molding container 21. The base 23 is detachably mounted on an upper surface of the elevation table 22, and an upper surface of the base 23 serves as a part for molding the additive product W thereon. That is, the metal powder P is placed on an upper surface of the base 23 in a layered manner along with lowering of the elevation table 22, and the additive product W can be supported by the base 23 during additive manufacturing.

The powder supply device 30 is provided inside the chamber 10 and is adjacent to the molded object support device 20. The powder supply device 30 includes a powder storage container 31, a supply table 32, and a recoater 33. The powder storage container 31 has an opening on an upper side, and a height of the opening of the powder storage container 31 is set to be the same as that of the opening of the molding container 21. The powder storage container 31 has an inner wall surface parallel to the axis in the up-down direction. The supply table 32 is provided so as to be movable in the up-down direction along the inner wall surface inside the powder storage container 31. In the powder storage container 31, the metal powder P is stored in an upper region of the supply table 32.

The recoater 33 is provided so as to be capable of reciprocating above both openings, across an entire region of the opening of the molding container 21 and an entire region of the opening of the powder storage container 31. For example, when moving from a right side to a left side in a left-right direction in FIG. 1, that is, when moving from the opening of the powder storage container 31 toward the opening of the molding container 21, the recoater 33 transports the metal powder P, which is piled up, from the opening of the powder storage container 31 to the molding container 21.

Further, the recoater 33 levels the metal powder P transported onto the upper surface of the base 23, which is lowered as the lowered elevation table 22 is lowered as will be described below, and disposes, that is, recoats metal powders P of a same kind in a layered manner on the upper surface of the base 23. Here, the term "same kind" means that material of the metal powders P, which are material powders, is the same, and that an average particle size or the like of the metal powders P is within a predetermined range.

As illustrated in FIG. 1, the light beam irradiation device 40 is disposed outside the chamber 10, and irradiates a surface of the metal powders P of a same kind disposed in a layered manner on the upper surface of the base 23, with a light beam 40a from outside the chamber 10. As described above, the light beam 40a is a laser beam, an electron beam, or the like. The light beam irradiation device 40 heats the metal powder P to a temperature equal to or higher than a melting point thereof by irradiating the recoated metal powder P with the light beam 40a. Accordingly, the metal powder P is melted and thereafter solidified (or sintered), and the additive product W formed of an integrated layer is molded (manufactured). That is, the adjacent metal powders P are integrated by fusion.

The light beam irradiation device 40 can change a beam intensity while changing an irradiation position of the light beam 40a, in accordance with a preset program. By changing the irradiation position of the light beam 40a, the additive product W having a three-dimensional shape can be molded. Further, by changing the beam intensity of the light beam 40a, input energy (heat amount flowing into an irradiated portion) in the irradiated portion of the recoated metal powder P is changed, and a molten state of the metal powder P can be changed. Here, a range that can be irradiated with the light beam 40a is narrower than a range heated by the heating device 50.

Figure 2:
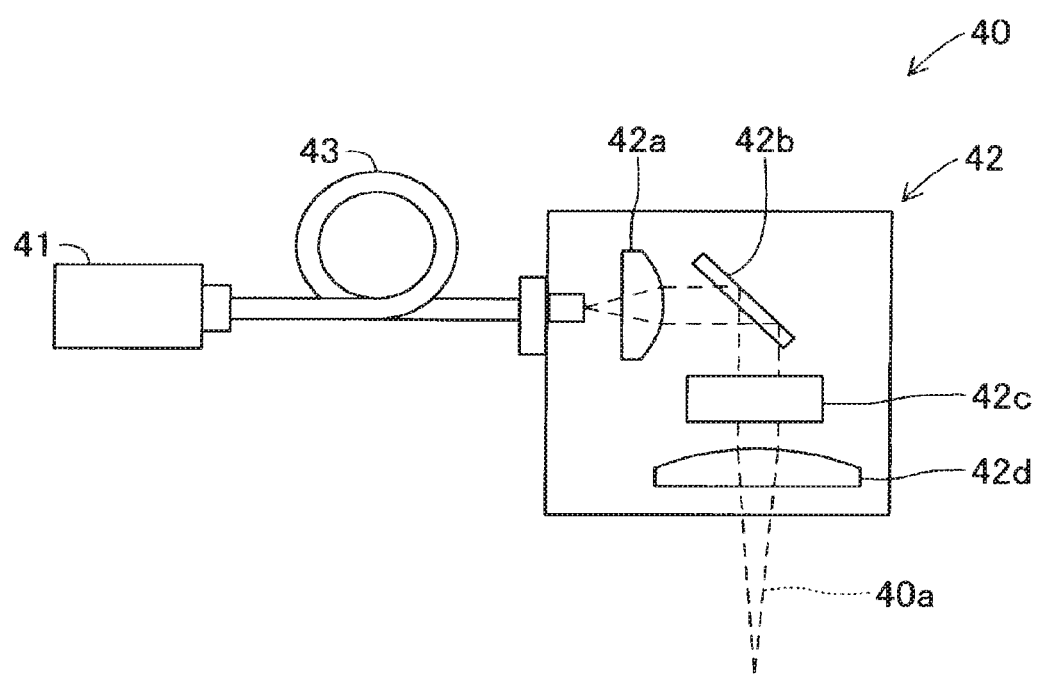
FIG. 2 is a diagram illustrating a configuration of a light beam irradiation unit of FIG. 1.

As illustrated in FIGS. 1 and 2, the light beam irradiation device 40 includes a laser oscillator 41 and a laser head 42. The light beam irradiation device 40 further includes an optical fiber 43 that transmits the light beam 40a (near-infrared laser beam) oscillated from the laser oscillator 41 to the laser head 42.

The laser oscillator 41 oscillates such that a wavelength reaches a predetermined infrared wavelength that is set in advance, and generates a near-infrared laser beam of a continuous wave as the light beam 40a. The laser head 42 is disposed at a predetermined distance from the surface of the metal powder P disposed in a layered manner in the chamber 10. As illustrated in FIG. 2, the laser head 42 includes an optical system that is composed of a collimator lens 42a, a mirror 42b, a galvano scanner 42c, and an fθ lens 42d.

Accordingly, in the laser head 42, the near-infrared laser beam (light beam 40a) incident via the optical fiber 43 is collimated by the collimator lens 42a and deflected to be parallel light. As illustrated in FIG. 2, the collimated near-infrared laser beam (light beam 40a) is changed in a traveling direction by the mirror 42b so as to be incident on the galvano scanner 42c.

In the laser head 42, the galvano scanner 42c freely changes the traveling direction, that is, an irradiation angle of the near-infrared laser beam (light beam 40a). Accordingly, a predetermined position on a layer surface of the recoated metal powder P is irradiated with the near-infrared laser beam (light beam 40a) concentrated by the fθ lens 42d. That is, the laser head 42 can move the light beam 40a in the left-right direction and a direction perpendicular to the left-right direction, in other words, in a horizontal direction including these directions parallel to the layer surface of the recoated metal powder P.

The layer surface of the metal powder P is a surface exposed to the upper side of the metal powder P recoated, that is, disposed in a layered manner on the upper surface of the base 23. The light beam 40a is emitted into the chamber 10 through a transparent glass or resin provided on an upper side of the chamber 10.

The heating device 50 is built in the elevation table 22. The heating device 50 is a heater for heating the additive product W via the base 23, and heats the entire base 23 via the elevation table 22. As the heating device 50, various heaters such as a coil heater, a cartridge heater, a nozzle heater, and a planar heater can be applied. A heating range of the heating device 50 is set to a range including a part of the irradiation range of the light beam 40a. Here, the heating device 50 does not melt the metal powder P as the light beam 40a does.

The control device 60 controls the molded object support device 20, the powder supply device 30, the light beam irradiation device 40, and the heating device 50. Further, the control device 120 of the quality estimation device 100 operates in cooperation with the control device 60.

(2. Configuration of Control Device 60)

Figure 3:
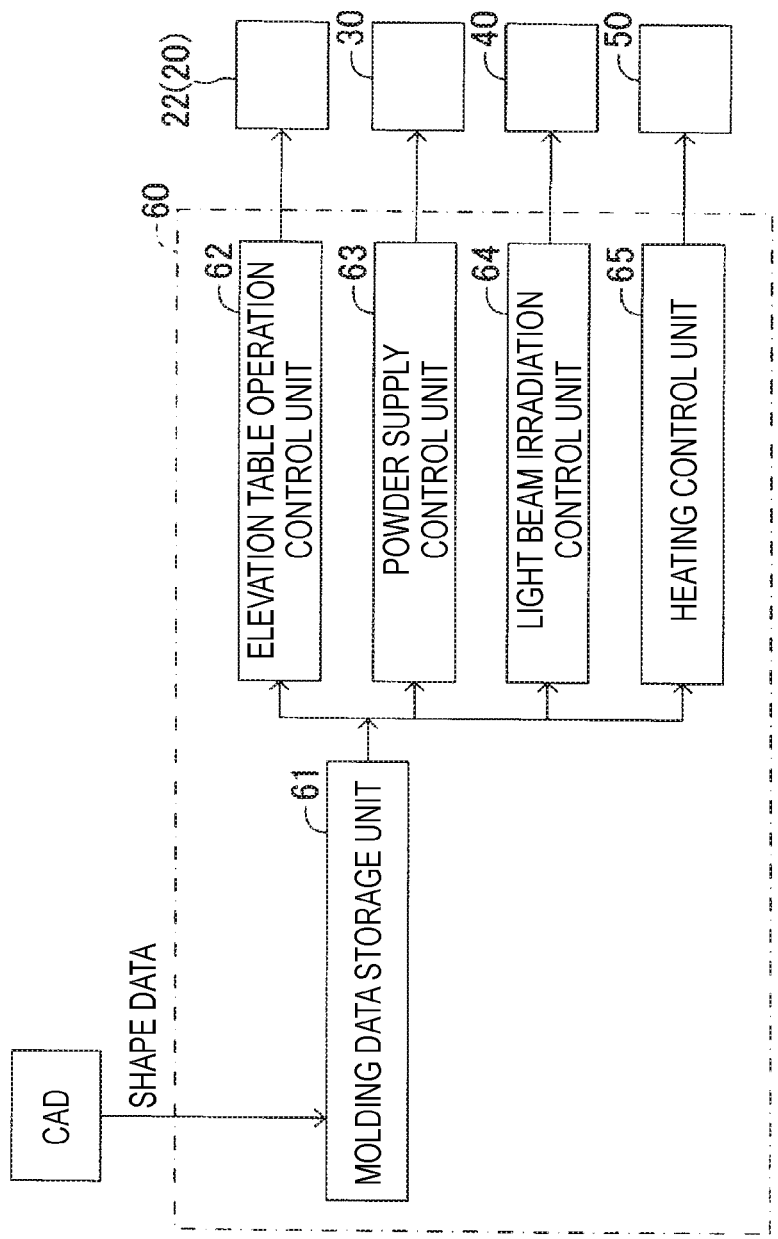
FIG. 3 is a block diagram illustrating a configuration of a control device of the additive manufacturing device of FIG. 1.

The control device 60 is a microcomputer including a CPU, a ROM, a RAM, an interface, and the like as main components. As illustrated in FIG. 3, the control device 60 includes a data storage unit 61, an elevation table operation control unit 62, a powder supply control unit 63, a light beam irradiation control unit 64, and a heating control unit 65.

The data storage unit 61 stores data for each divided layer, which is obtained by dividing an entire space including the additive product W by a predetermined thickness, and stores various kinds of data including shape data indicating a shape of the divided layer. Here, the shape data is supplied from, for example, a computer aided design (CAD) terminal that is not illustrated in detail in FIG. 3.

The elevation table operation control unit 62 controls operation of a drive unit (not illustrated) that lifts and lowers the elevation table 22. When the powder supply device 30 supplies the metal powder P, the elevation table operation control unit 62 causes the elevation table 22 to be lowered at a preset lowering amount.

The powder supply control unit 63 controls operation of the powder supply device 30. Specifically, the powder supply control unit 63 performs control to cause the supply table 32 to move in the up-down direction to pile up the metal powder P stored in the powder storage container 31 from the opening of the powder storage container 31, and to cause the recoater 33 to reciprocate.

The light beam irradiation control unit 64 controls operation of the light beam irradiation device 40. Specifically, the light beam irradiation control unit 64 controls the irradiation position (irradiation trajectory) and beam intensity of the light beam 40a emitted by the light beam irradiation device 40, based on the shape data stored in the data storage unit 61.

The heating control unit 65 controls operation of the heating device 50. Details of operation control of the heating device 50 by the heating control unit 65 are not directly related to the invention, and thus a description thereof will be omitted.

(3. Configuration of Quality Estimation Device 100)

As illustrated in FIG. 1, the imaging device 110 is disposed at a position facing the upper surface of the base 23, in the chamber 10 of the additive manufacturing device 1. The imaging device 110 images a region including a molding surface during manufacturing of the additive product W, that is, at the time of manufacturing the additive product W at a molding position by irradiating the metal powder P with the light beam 40a to melt the metal powder P and solidifying the metal powder P.

The imaging device 110 has a light, and includes an illumination unit 111 that illuminates an entire layer surface of the metal powder P, which is a region including the molding surface, from a predetermined direction (for example, one direction). The imaging device 110 has a camera, and includes an imaging unit 112 that images the entire layer surface of the metal powder P, that is, a region including the molding surface, which is illuminated by the illumination unit 111. Accordingly, after molding by the light beam irradiation device 40, the imaging unit 112 images the entire layer surface of the metal powder P including the molding surface during manufacturing, which is illuminated by the illumination unit 111.

The control device 120 controls the imaging device 110. The control device 120 estimates and determines presence or absence of an internal defect H of the additive product W, which is related to the quality of the additive product W, based on an image imaged by the imaging device 110.

(4. Configuration of Control Device 120)

Figure 4:
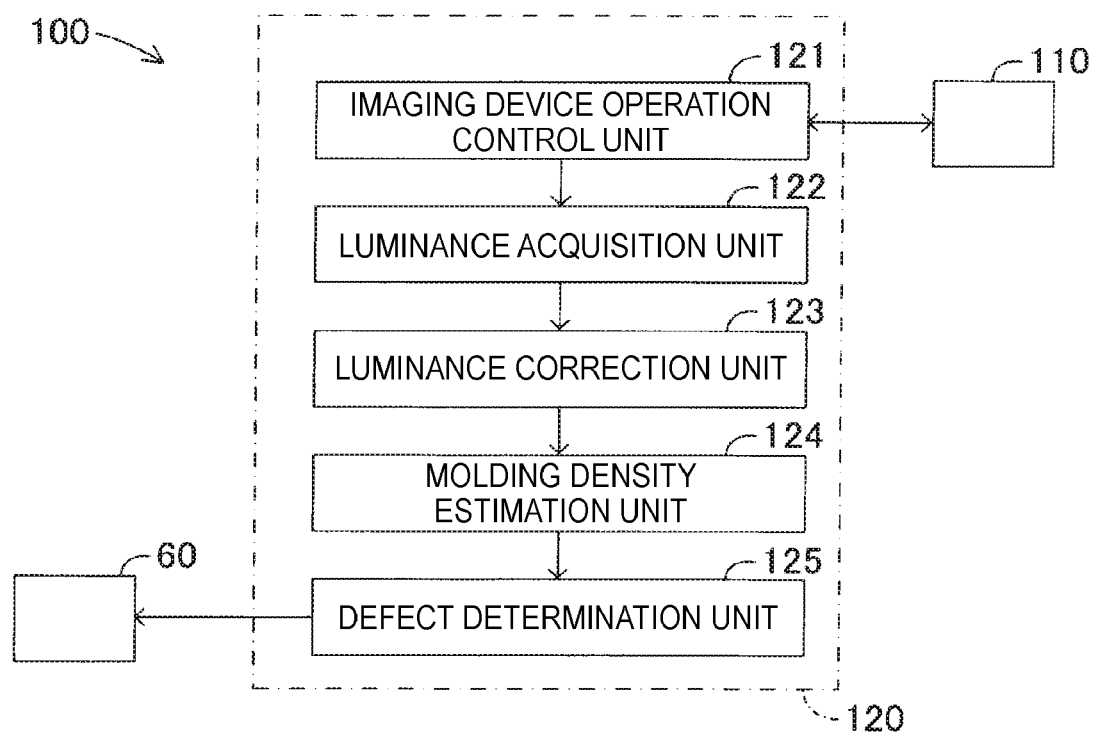
FIG. 4 is a block diagram illustrating a configuration of a control device of a quality estimation device of FIG. 1.

The control device 120 is a microcomputer including a CPU, a ROM, a RAM, an interface, and the like as main components. As illustrated in FIG. 4, the control device 120 includes an imaging device operation control unit 121, a luminance acquisition unit 122, a luminance correction unit 123, a molding density estimation unit 124, and a defect determination unit 125.

The imaging device operation control unit 121 controls operation of the imaging device 110. The imaging device operation control unit 121 controls the operation of the imaging device 110 such that an illumination operation of the illumination unit 111 of the imaging device 110 and an imaging operation of the imaging unit 112 are synchronized. Further, the imaging device operation control unit 121 acquires, from the imaging device 110, image data obtained by imaging the layer surface of the metal powder P which includes the molding surface of the additive product W.

The luminance acquisition unit 122 acquires the image data from the imaging device operation control unit 121. Further, the luminance acquisition unit 122 performs image processing on an image represented by the acquired image data to obtain luminance that is obtained by quantifying brightness of light reflected by the molding surface. The luminance acquisition unit 122 outputs the acquired luminance to the luminance correction unit 123. Here, the illuminance is what is obtained by quantifying the brightness (intensity) of the light in the image represented by the image data at, for example, 256 gradations, which is reflected when the molding surface and the layer surface are illuminated by the illumination unit 111 of the imaging device 110.

The luminance correction unit 123 acquires luminance of a region including the molding surface from the luminance acquisition unit 122. Further, as will be described below, the luminance correction unit 123 performs image processing on the image represented by the image data, thereby correcting the brightness, which changes depending on an extension direction of a molding portion of the additive product W which coincides with a scanning direction of the light beam 40a, in accordance with the extension direction. Further, the luminance correction unit 123 corrects peripheral luminance in a peripheral region other than the molding surface of the layer surface to preset reference luminance so that the molding surface can be clearly identified.

The molding density estimation unit 124 estimates a molding density of the additive product W. The molding density estimation unit 124 acquires image data, in which the luminance is corrected by the image processing, from the luminance correction unit 123. Further, as will be described below, the molding density estimation unit 124 measures the luminance of the molding surface by analyzing the acquired image data, and estimates the molding density of the additive product W based on the luminance of the molding surface.

The defect determination unit 125 determines whether an internal defect H is present in the additive product W, which is a void affecting the mechanical strength that indicates quality thereof. The defect determination unit 125 determines whether an internal defect H is present, which affects the mechanical strength of the additive product W, by using the molding density estimated by the molding density estimation unit 124. Further, the defect determination unit 125 outputs a determination result to the control device 60.

(5. Correlation between Mechanical Strength and Molding Density of Additive Product W)

Figure 5:
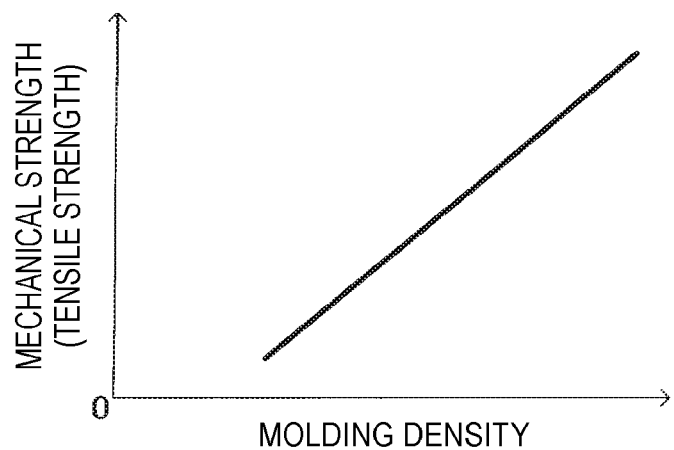
FIG. 5 is a graph illustrating a relationship between a molding density and a mechanical strength.

A correlation is established between the mechanical strength such as a tensile strength of the additive product W and the molding density (or specific gravity) of the additive product W with the metal powder P melted and solidified. That is, as illustrated in FIG. 5, a relationship is established that the mechanical strength increases as the molding density increases (the density increases), and the mechanical strength decreases as the molding density decreases (the density decreases).

Figure 6:
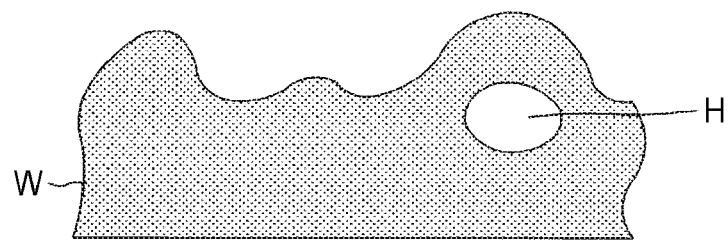
FIG. 6 is a diagram for illustrating an internal defect.

In additive manufacturing, a part of the metal powder P is melted by irradiating the metal powder P with the light beam 40a to mold the additive product W. In this case, as schematically illustrated in FIG. 6, the melted metal powder P is scattered due to a beam intensity of the emitted light beam 40a or an incident angle of the light beam 40a with respect to the layer surface of the recoated metal powder P, and as a result, a void, that is, the so-called internal defect H may occur inside the additive product W. When the internal defect H occurs, the molding density of the additive product W is reduced. Therefore, in view of the relationship between the mechanical strength and the molding density, it is important to determine the presence or absence of the internal defect H in the manufacturing (molding) of the additive product W.

(6. Definition of Terms Relating to Luminance and Standard Deviation)

Figure 7:
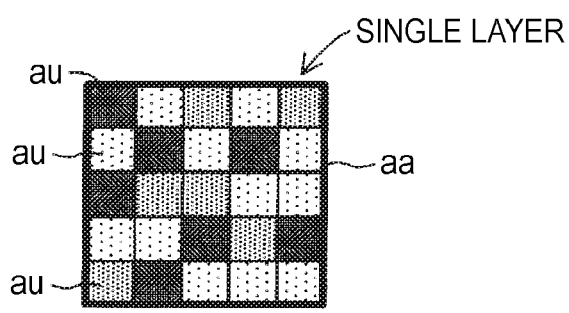
FIG. 7 is a diagram for illustrating unit area luminance and the single layer average luminance.

Here, definitions of terms used in the following description will be described. As illustrated in FIG. 7, "unit area luminance au" is a value corresponding to luminance per unit area of the molding surface. As illustrated in FIG. 7, "single layer average luminance aa" is a value obtained by averaging the "unit area luminance au" in an additive layer (single layer) additively manufactured. For example, in FIG. 7, an average value of twenty-five "unit area luminance au" is the "single layer average luminance aa".

Figure 8:
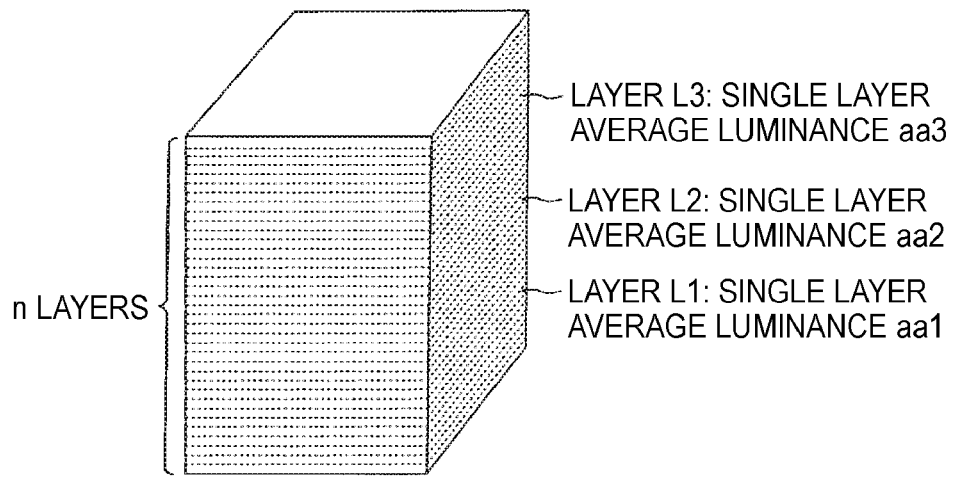
FIG. 8 is a diagram for illustrating multiple-layer average luminance, all-layer average luminance, multiple-layer average standard deviation, and all-layer average standard deviation.

In multiple layers of a single layer L1, a single layer L2, a single layer L3 . . . each of which is an additively manufactured additive layer, as illustrated in FIG. 8, "multiple-layer average luminance am" is a value obtained by averaging "single layer average luminance aa1", "single layer average luminance aa2", "single layer average luminance aa3" . . . , that is, dividing the sum of these values by the number of layers. For example, in FIG. 8, a value obtained by averaging three of the "single layer average luminance aa1", the "single layer average luminance aa2", and the "single layer average luminance aa3", that is, dividing the sum of these values by "3", which is the number of layers, is the "multiple-layer average luminance am". Further, as illustrated in FIG. 8, "all-layer average luminance at" is a value obtained by averaging the "single layer average luminance aa" of n layers, which are all layers additively manufactured, that is, dividing the sum of these values by "n" that is the number of layers.

Further, "single layer standard deviation bu" is a value indicating variation in the "unit area luminance au" of the "single layer average luminance aa", for example, variation in the twenty-five "unit area luminance au" in FIG. 7. Further, "multiple-layer average standard deviation ba" is an average value of the "single layer standard deviation bu" of multiple layers that are additively manufactured. For example, in FIG. 8, an average value obtained by averaging the "single layer standard deviation bu" of the single layers L1, L2, and L3, that is, dividing the sum of these values by three, which is the number of layers, is the "multiple-layer average standard deviation ba". Further, "all-layer average standard deviation bt" is an average value obtained by averaging the "single layer standard deviation bu" for all layers that are additively manufactured. For example, in FIG. 8, an average value obtained by averaging the "single layer standard deviation bu" of n layers wherein "n" is the number of layers, is the "all-layer average standard deviation bt".

In the following description, "average luminance information A" contains the "single layer average luminance aa", the "multiple-layer average luminance am", and the "all-layer average luminance at". Further, "standard deviation information B" contains the "single layer standard deviation bu", the "multiple-layer average standard deviation ba", and the "all-layer average standard deviation bt".

(7. Relationship Between Molding Density and Luminance of Molding Surface)

As described above, in the case of manufacturing (molding) the additive product W by melting the metal powder P by irradiation with the light beam 40a, the molding density is increased or decreased due to presence of the internal defect H. In the case where the internal defect H is present in the additive product W, in particular, it is empirically known that a change occurs in the luminance of the molding surface (the surface irradiated with the light beam 40a) of the additive product W. Here, the inventors of the invention have found a correlation between the luminance of the molding surface and the molding density by performing various experiments. Hereinafter, the correlation will be described.

At the time of examining the correlation, a plurality of rectangular parallelepipeds are prepared, as evaluation samples, by irradiating the metal powder P with the light beam 40a, each of which has a square upper surface and bottom surface and is composed of n layers as illustrated in FIG. 8. In this case, for example, irradiation conditions of the light beam 40a and the like are changed such that the evaluation samples are prepared to have different molding densities.

Figure 9:
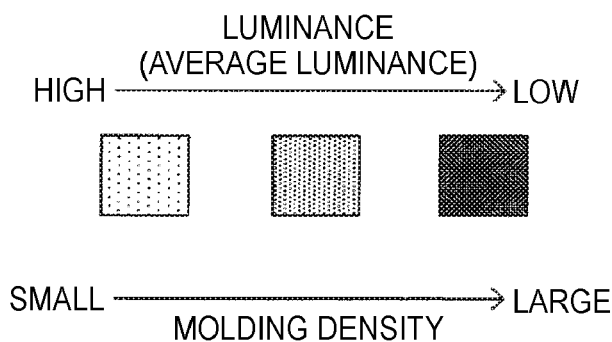
FIG. 9 is a diagram for illustrating a relationship between luminance and a molding density.

With respect to the prepared evaluation sample, as illustrated in FIG. 9, as the molding density increases, the luminance of the molding surface tends to decrease. At the time of preparing the evaluation samples, each molding surface is imaged after being irradiated with the light beam 40a, and image data representing an imaged image is acquired. Further, a square molding surface of the evaluation sample in the acquired image data is divided into unit areas as illustrated in FIG. 7 to measure the "unit area luminance au".

Further, the "single layer average luminance aa", the "multiple-layer average luminance am", and the "all-layer average luminance at" are calculated using the "unit area luminance au". Further, the "single layer standard deviation bu", the "multiple-layer average standard deviation ba", and the "all-layer average standard deviation bt" are calculated. Accordingly, the molding density can be expressed as a multiple regression equation (model) using "average luminance information" and "standard deviation information".

Figure 10:
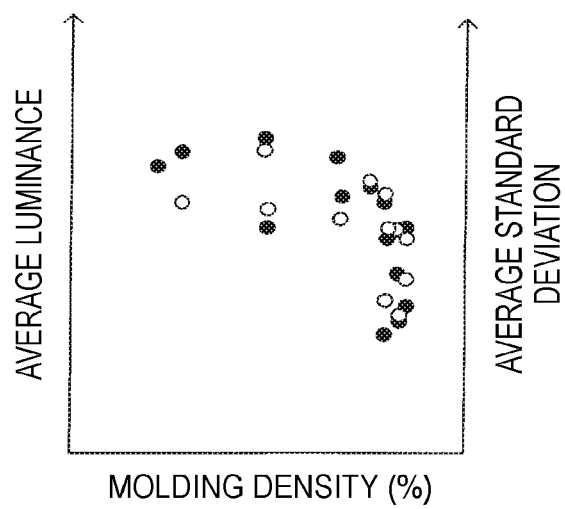
FIG. 10 is a graph illustrating relationships among a molding density, multiple-layer average luminance, and multiple-layer average standard deviation for aluminum.

Specifically, a case where the metal powder P is aluminum will be described. With respect to an evaluation sample prepared as described above using the metal powder P of aluminum, a result of measuring and plotting the "unit area luminance au" of the molding surface is illustrated in FIG. 10. In FIG. 10, a horizontal axis is the molding density, a first vertical axis is, for example, the "multiple-layer average luminance am" indicated by a black dot, and the second vertical axis is, for example, the "multiple-layer average standard deviation ba" indicated by a white dot.

As illustrated in FIG. 10, in the case where the metal powder P is aluminum, a multiple correlation coefficient for i) the molding density and the "multiple-layer average luminance am" that is the luminance, and ii) the molding density and the "multiple-layer average standard deviation ba" that is the standard deviation, is high. Therefore, in the case where the metal powder P is aluminum, the molding density ρ can be estimated based on a multiple regression equation (model formula) using the "average brightness information A" and the "standard deviation information B", as illustrated in Formula (1) below.

$$\rho = K1 - K2 \times A + K3 \times B + K4 \times C^2 + G \quad \text{Formula (1)}$$

In Formula (1), K1 is a predetermined value determined experimentally, and G is an error determined experimentally. In Formula (1), K2, K3, and K4 each represent a predetermined coefficient, which are determined experimentally. A value of any one of the "single layer average luminance aa", the "multiple-layer average luminance am", and the "all-layer average luminance at", can be assigned to A in Formula (1), for example, the "multiple-layer average luminance am". Further, a value of any one of the "single layer standard deviation bu", the "multiple-layer average standard deviation ba", and the "all-layer average standard deviation bt", can be assigned to B in Formula (1), for example, the "multiple-layer average standard deviation ba". Note that C in Formula (1) is a value for standardizing the luminance, and is, for example, a value obtained by subtracting the "all-layer average luminance at" from the "multiple-layer average luminance am".

Figures 11, 12:
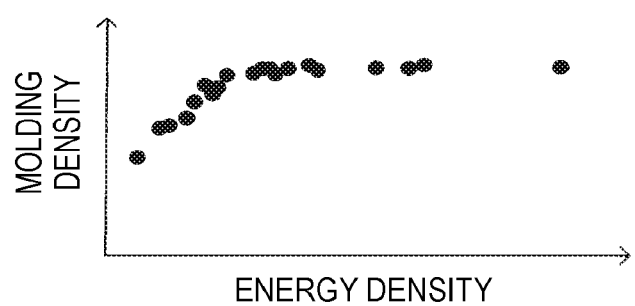
FIG. 11 is a graph illustrating a relationship between an energy density and a molding density for SKD61.
FIG. 12 is a graph illustrating relationships among the molding density, multiple-layer average luminance, and multiple-layer average standard deviation for SKD61.

Next, a case where the metal powder P is SKD61 will be described. SKD61 is an alloy steel having the following chemical composition percentages: C (0.35-0.42); Si (0.8-1.2); Mn (0.25-0.5); P (max 0.03); S (max 0.03); Cr (4.8-5.5); Mo (1-1.5); and V (0.8-1.5). In the case of SKD61, the magnitude of the energy density at the time of melting by the light beam 40a is affected as compared with the case of aluminum. That is, in the case of melting the SKD61, as illustrated in FIG. 11, a relative density after melting is reduced when the energy density is small, and as the energy density increases, the relative density after melting increases and stabilizes. Therefore, in the case of SKD61, the energy density of the light beam 40a is set to be equal to or higher than a certain level to obtain a correlation.

With respect to an evaluation sample prepared as described above using the metal powder P of SKD61, a result of measuring and plotting the "unit area luminance au" of the molding surface is illustrated in FIG. 12. In FIG. 12, a horizontal axis is the molding density, a first vertical axis is, for example, the "multiple-layer average luminance am" indicated by a black dot, and the second vertical axis is, for example, the "multiple-layer average standard deviation ba" indicated by a white dot.

As illustrated in FIG. 12, in the case where the metal powder P is SKD61, by considering the energy density as described above, a multiple correlation coefficient for i) the molding density and the "multiple-layer average luminance am" and ii) the molding density and the "multiple-layer average standard deviation ba" is increased. Therefore, in the case where the metal powder P is SKD61, the molding density ρ can be estimated based on a multiple regression equation (model formula) using the "average brightness information A" and the "standard deviation information B", as illustrated in Formula (2) below.

$$\rho = K1 - K2 \times A + K3 \times B + K4 \times D^2 + G \quad \text{Formula (2)}$$

In Formula (2), K1 is a predetermined value determined experimentally, and G is an error determined experimentally. In Formula (2), K2, K3, and K4 each represent a predetermined coefficient, which are determined experimentally. A value of any one of the "single layer average luminance aa", the "multiple-layer average luminance am", and the "all-layer average luminance at", can be assigned to A in Formula (2), for example, the "multiple-layer average luminance am". Further, a value of any one of the "single layer standard deviation bu", the "multiple-layer average standard deviation ba", and the "all-layer average standard deviation bt", can be assigned to B in Formula (2), for example, the "multiple-layer average standard deviation ba". D in Formula (2) is a value for standardizing the standard deviation, and is, for example, a value obtained by subtracting the "all-layer average standard deviation bt" from the "multiple-layer average standard deviation b a".

Note that the multiple regression equation (model formula) for estimating the molding density ρ is not limited to the Formulas (1) and (2), and, for example, may have both the value C for standardizing the luminance and the value D for standardizing the standard deviation. Further, not limited to "A", "B", "C", and "D" illustrated in Formulas (1) and (2), other values, such as values related to the energy density, may be added to the multiple regression equation (model formula).

Generally, in the imaging device 110 provided in the additive manufacturing device 1, the illumination unit 111 illuminates the inside of the chamber 10 in a predetermined direction, for example, from one direction. In this case, depending on the scanning direction of the light beam 40a with respect to an illumination direction in which the illumination unit 111 performs illumination, a difference may occur in the "unit area luminance au" when the molding surface illuminated by the illumination unit 111 is imaged. For example, in a case where the scanning direction of the light beam 40a is parallel to the illumination direction of the illumination unit 111 and in a case where the scanning direction of the light beam 40a is perpendicular to the illumination direction, in particular, a difference occurs in the "unit area luminance au" since reflection state of light due to unevenness of the molding surface is different.

Such a difference in the "unit area luminance au" depending on the scanning direction of the light beam 40a (extension direction of the molding portion) can be experimentally measured in advance for each of a plurality of directions obtained by dividing (for example, dividing for every 30 degrees) between a direction parallel to the illumination direction of the illumination unit 111 of the imaging device 110 and a direction perpendicular to the illumination direction of the illumination unit 111 of the imaging device 110. Further, a correlation between an operation direction and the "unit area luminance au" can be acquired based on a measurement result.

Therefore, in a case of measuring the "unit area luminance au", image processing is performed in which the "unit area luminance au" in the image of the molding surface and the layer surface represented by the image data is corrected (complemented) in accordance with the scanning direction of the light beam 40a. Accordingly, in a case of calculating the "single layer average luminance aa", the "multiple-layer average luminance am", and the "all-layer average luminance at", it is possible to more accurately measure the "unit area luminance au" by correcting (complementing) the "unit area luminance au" in advance, regardless of the scanning direction.

The scanning direction of the light beam 40a, for example, may be changed for each of adjacent additive layers in the additive product W in order to prevent occurrence of a problem caused by anisotropy in the additive product W. In this case, as described above, a difference in correlation with an illumination direction of the illumination unit 111 may occur due to a change in the scanning direction, and as a result, the "unit area luminance au" may be affected.

Therefore, in order to obtain the above Formulas (1) and (2) having high prediction accuracy, it is necessary to consider the correlation between the illumination direction of the illumination unit 111 and the scanning direction. In this case, with respect to additive layers having the same or similar scanning direction of the light beam 40a among a plurality of additional layers, for example, the affection due to the change in the scanning direction can be reduced by averaging and using the "unit area luminance au". As a result, the above Formulas (1) and (2) having high prediction accuracy can be obtained.

Further, in the image processing, in order to more accurately measure the "unit area luminance au", the luminance of the peripheral region other than the molding surface among the layer surface is corrected to reference luminance. Accordingly, the reference luminance of the peripheral region other than the molding surface can be used as a reference for the measurement, and thus the molding surface is clear and the "unit area luminance au" can be more accurately measured. Therefore, it is possible to accurately estimate the molding density ρ by inputting any one of the "single layer average luminance aa", the "multiple-layer average luminance am", and the "all-layer average luminance at", or inputting any one of the "single layer standard deviation bu", the "multiple-layer average standard deviation ba" and the "all-layer average standard deviation bt" with respect to the multiple regression equation (model formula) described above.

It is also possible to obtain the multiple regression equations (model formulas) of the Formulas (1) and (2), by taking into consideration the fact that a difference may occur in the "unit area luminance au" correspondingly to the scanning direction and the illumination direction of the illumination unit 111. That is, a plurality of multiple regression equations (model formulas) are obtained in advance correspondingly to the scanning direction of the light beam 40a with respect to the illumination direction of the illumination unit 111.

Specifically, the multiple regression equation (model formula) can be obtained for each of the plurality of directions obtained by dividing (for example, dividing for every 30 degrees) between the direction parallel to the illumination direction of the illumination unit 111 of the imaging device 110 and the direction perpendicular to the illumination direction of the illumination unit 111 of the imaging device 110. Alternatively, the illumination direction of the illumination unit 111 of the imaging device 110 or an imaging direction of the imaging unit 112 is appropriately changed in accordance with a state of obtaining the multiple regression equation (model formula). Further, by using the imaged image data to measure the "unit area luminance au", the molding density ρ can be estimated by using the multiple regression equation (model formula) that is obtained in advance.

(8. Additive Manufacturing Method)

Figure 13:
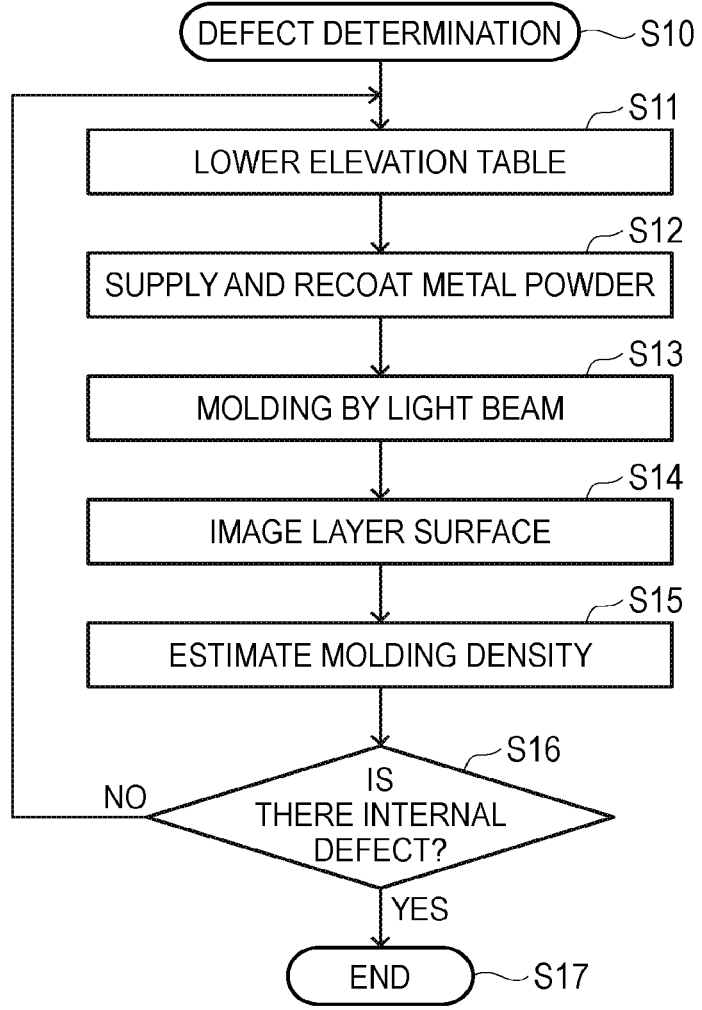
FIG. 13 is a flowchart illustrating a defect determination program.

Next, an additive manufacturing method using the additive manufacturing device 1 will be described with reference to a flowchart of a defect determination program illustrated in FIG. 13. The control device 60 (light beam irradiation control unit 64) starts the irradiation of the light beam 40a by operating the light beam irradiation device 40, based on the shape data of the additive product W stored in the data storage unit 61. That is, the control device 60 (light beam irradiation control unit 64) executes a predetermined program (not illustrated) to perform scanning with the light beam 40a based on the shape data to heat the metal powder P to a temperature equal to or higher than the melting point thereof. Here, the light beam irradiation control unit 64 performs scanning with the light beam 40a in accordance with an appropriate changeable irradiation condition such as a beam intensity, a scanning speed, a scanning interval, and a scanning pattern of the light beam 40a.

The metal powder P is melted by being irradiated with the light beam 40a and is solidified thereafter. In this way, a part irradiated with the light beam 40a is integrated by a strong force, and the additive product W is manufactured (molded). In manufacturing (molding) of the additive product W, the control device 120 of the quality estimation device 100 and the control device 60 execute the defect determination program of FIG. 13 in cooperation, and determine the presence or absence of the internal defect H to manufacture (mold) the additive product W.

First, the control device 60 (CPU constituting a microcomputer) starts execution of an additive manufacturing program in step S10, and in the subsequent step S11, the control device 60 (elevation table operation control unit 62) causes the elevation table 22 to be lowered by a preset lowering amount (elevation table lowering process). Accordingly, the base 23 mounted on the elevation table 22 is also lowered by the preset lowering amount. When the elevation table 22 and the base 23 are lowered, the control device 60 (elevation table operation control unit 62) advances the process to step S12.

In step S12, the control device 60 (powder supply control unit 63) supplies the metal powder P to the upper surface of the base 23 and recoats the metal powder P (powder supplying process). Specifically, the powder supply control unit 63 causes the supply table 32 of the powder supply device 30 to be lifted to pile up a desired amount of the metal powder P from the opening of the powder storage container 31. In the powder supply device 30, the metal powder P is stored in advance in the powder storage container 31 with the supply table 32 being positioned on a lower side.

Further, the powder supply control unit 63 moves the recoater 33 from an original position that is a powder supply device 30 side toward a molded object support device 20 side that is the other end side of the base 23. Accordingly, the recoater 33 performs recoating while supplying the metal powder P to the upper surface of the base 23. The recoater 33 stops when advancing to the other end side of the base 23. Further, when the metal powder P is supplied and recoated on the upper surface of the base 23, the control device 60 (powder supply control unit 63) advances the process to step S13.

In step S13, the control device 60 (light beam irradiation control unit 64) operates the light beam irradiation device 40 based on the shape data stored in the data storage unit 61 (molding process). Specifically, the light beam irradiation control unit 64 changes the beam intensity of the light beam 40a generated by the laser oscillator 41 or changes the irradiation angle of the light beam 40a by using the galvano scanner 42c of the laser head 42, and irradiates with the light beam 40a the layer surface of the metal powder P that is disposed in a layered manner. Accordingly, the molding surface is molded in the additive product W in accordance with the shape data. Further, when the light beam 40a is emitted, the control device 60 (light beam irradiation control unit 64) advances the process to step S14.

In step S14, the control device 120 capable of communicating with the control device 60 receives, from the control device 60, a signal related to the execution of the program. Further, the control device 120 (imaging device operation control unit 121) operates the imaging device 110 to image the layer surface in the base 23 after being irradiated with the light beam 40a (imaging process). Specifically, the imaging device operation control unit 121 operates the illumination unit 111 of the imaging device 110 to illuminate the layer surface, and, in this state, the imaging unit 112 images the region including the molding surface during manufacturing. Here, the illumination unit 111, in a state of being fixed at a predetermined position inside the chamber 10, emits, for example, a white light in a flashing manner in a predetermined direction, for example, in one direction, and the imaging unit 112 images the region including the molding surface at the moment of being illuminated by the illumination unit 111. Further, the imaging device operation control unit 121 outputs image data representing the imaged image to the luminance acquisition unit 122, and the control device 120 advances the process to step S15.

In step S15, the control device 120 (luminance acquisition unit 122, luminance correction unit 123, and molding density estimation unit 124) estimates the molding density ρ of the additive product W based on the image data acquired by the imaging device 110 in step S14 (molding density estimation process). Specifically, the luminance correction unit 123 performs the image processing described above on the image of the molding surface and the layer surface which is represented by the image data acquired by the luminance acquisition unit 122. Further, the molding density estimation unit 124 calculates a value of any one of the "single layer average luminance aa", the "multiple-layer average luminance am", and the "all-layer average luminance at" of the molding surface irradiated with the light beam 40a. Further, the molding density estimation unit 124 calculates a value of any one of the "single layer standard deviation bu", the "multiple-layer average standard deviation ba", and the "all-layer average standard deviation bt". Further, the molding density estimation unit 124 calculates the value C and the value D as necessary, and estimates the molding density ρ by using the multiple regression equation (model formula) described above.

In step S16, the control device 120 (defect determination unit 125) determines whether an internal defect H is present in the additive product W based on the molding density ρ estimated in step S15 (defect determination process). That is, if the molding density ρ is equal to or less than a preset reference molding density ρ0, it is determined to be "Yes" by the defect determination unit 125 since an internal defect H is present in the additive product W, and the process proceeds to step S17.

Further, the control device 120 causes the control device 60 of the additive manufacturing device 1 to stop the additive manufacturing of continuously manufacturing the additive product W that is currently under additive manufacturing and that is a defective product with the molding density ρ equal to or less than the reference molding density ρ0. Accordingly, it is possible to eliminate the time for continuously manufacturing (molding) the defective product, and it is possible to promptly start the manufacturing (molding) of a new additive product W. Therefore, the production efficiency can be improved.

Note that it is possible for the control device 60 to sort out and remove a defective product after the additive manufacturing is continued up to additive manufacturing of a final layer without being stopped. That is, in a case where it is determined to be "Yes" in step S16 by the control device 120 (defect determination unit 125), it is eliminated that the defective product proceeds to a next step (for example, an inspection process). Accordingly, for example, in a case of manufacturing a large number of the additive products W having the same shape, it is possible to continuously manufacture (mold) a non-defective product, and thus production efficiency is not reduced.

On the other hand, if the estimated molding density ρ is larger than the reference molding density ρ0, it is determined to be "No" by the defect determination unit 125 since there is few internal defect H contained in the additive product W or there is no internal defect H in the additive product W, and the process returns to step S11. In this case, the control device 60 of the additive manufacturing device 1 performs the processing of the steps subsequent to step S11, and performs additive manufacturing of a next layer.

As can be understood from the above description, according to the quality estimation device 100 of the additive product W described above, during manufacturing of the additive product W, the luminance correction unit 123 can correct the "unit area luminance au" reflected on the molding surface in accordance with the scanning direction of the light beam 40a, and the molding density estimation unit 124 can estimate the molding density ρ based on the "multiple-layer average luminance am". Further, the defect determination unit 125 can determine the presence or absence of the internal defect H of the additive product W based on the molding density ρ estimated during the manufacturing. Therefore, the internal defect H of the additive product W that is additively manufactured can be easily detected by a non-destructive inspection.

Implementation of the invention is not limited to the embodiment described above, and various modifications can be made without departing from the object of the invention.

For example, in the embodiment described above, the molding density estimation unit 124 of the quality estimation device 100 measures the "unit area luminance au" per unit area with respect to the molding surface of the additive product W in the image (image data) imaged by the imaging device 110, so as to calculate a value of any one of the "single layer average luminance aa", the "multiple-layer average luminance am", and the "all-layer average luminance at". Alternatively, for example, in a case where resolution of the imaging unit 112 of the imaging device 110 is high, a value of any one of the "single layer average luminance aa", the "multiple-layer average luminance am", and the "all-layer average luminance at" may be calculated based on the "unit area luminance au" of each pixel (pixel) of the image with respect to the molding surface of the additive product W.

Accordingly, the number of measurable "unit area luminances au" can be increased. As a result, a more accurate value of the "single layer average luminance aa" and the like can be calculated, and the molding density ρ can be estimated more accurately.

In the embodiment described above, the molding density estimation unit 124 estimates the molding density ρ for each of the plurality of additive layers by using the "multiple-layer average luminance am". Alternatively, the molding density estimation unit 124 may estimate the molding density ρ for each layer by using the "single layer average luminance aa".

Further, in the embodiment described above, in the case where the molding density ρ is equal to or less than the reference molding density ρ0 and the internal defect H is present in the additive product W, the control device 120 causes the control device 60 of the additive manufacturing device 1 to stop the manufacturing (molding). Alternatively, in the case where the internal defect H is present in the additive product W, the control device 120 may cooperate with the control device 60 to identify a position of the internal defect H and to correct an existing internal defect H.

In this case, in the control device 120, for example, the defect determination unit 125 converts the existing position of the internal defect H to coordinates on the layer surface, that is, in the horizontal direction in order to identity the existing position of the internal defect H, and outputs coordinate data indicating the coordinates to the control device 60 (light beam irradiation control unit 64). The light beam irradiation control unit 64 operates the light beam irradiation device 40 to remove the internal defect H, and irradiates the internal defect H again with the light beam 40a.

Figure 14:
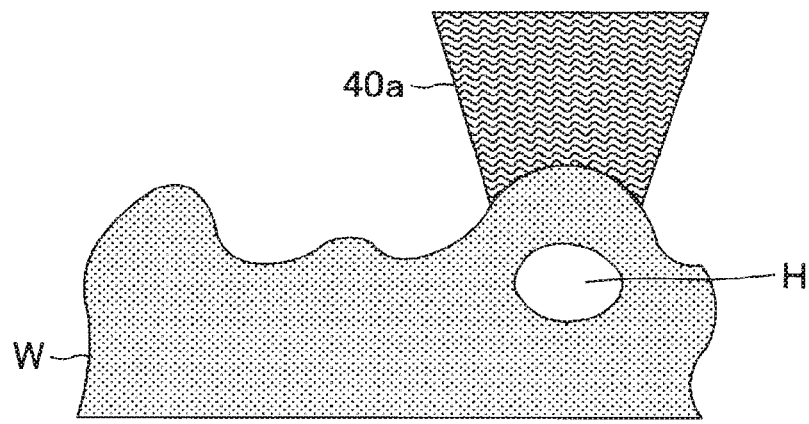
FIG. 14 is a diagram for illustrating correction of an internal defect according to a modification.
Figure 15:
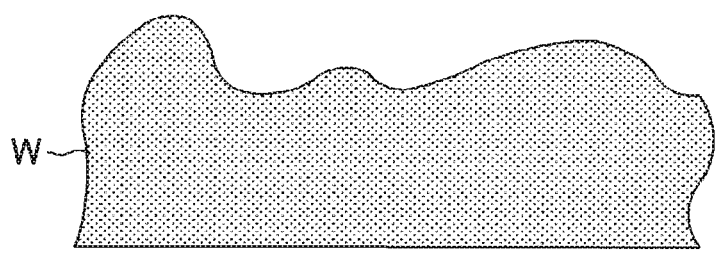
FIG. 15 is a diagram for illustrating a state in which the internal defect is corrected by the correction of FIG. 14.

Specifically, the light beam irradiation control unit 64 adjusts, based on the coordinate data indicating the position of the internal defect H, the irradiation angle and the like of the light beam 40a by using the galvano scanner 42c of the light beam irradiation device 40. Further, as illustrated in FIG. 14, the light beam irradiation device 40 directs the light beam 40a toward a periphery of the internal defect H. As described, by irradiating the periphery of the internal defect H with the light beam 40a, as illustrated in FIG. 15, the metal powder P existing in the periphery of the internal defect H is melted to fill the internal defect H and thereafter solidifies.

Accordingly, the internal defect H generated in the additive product W is removed by the re-emitted light beam 40a, and the internal defect H is corrected. Therefore, in this case, the internal defect H can be corrected at any time to manufacture the additive product W. Accordingly, it is possible to manufacture the additive product W in which a desired mechanical strength is obtained without having the internal defect H, and it is possible to prevent the production from being redone. Therefore, the time required for manufacturing can be greatly reduced.

Further, in the embodiment described above, the imaging device operation control unit 121 of the quality estimation device 100 operates the imaging device 110 to image a layer surface that is after being irradiated with the light beam 40a and before the metal powder P is recoated. Alternatively, the imaging device operation control unit 121 may operate the imaging device 110 to image a layer surface that is after being irradiated with the light beam 40a and after the metal powder P is recoated.

DESCRIPTION OF REFERENCE NUMERALS AND SIGNS

1 additive manufacturing device
10 chamber
20 molded object support device
21 molding container
22 elevation table
23 base
30 powder supply device
31 powder storage container
32 supply table
33 recoater
40 light beam irradiation device
40a light beam
41 laser oscillator
42 laser head
42a collimator lens
42b mirror
42c galvano scanner
42d lens
43 optical fiber
50 heating device
60 control device
61 data storage unit
62 elevation table operation control unit
63 powder supply control unit
64 light beam irradiation control unit
65 heating control unit
100 quality estimation device
110 imaging device
111 illumination unit
112 imaging unit
120 control unit
121 imaging device operation control unit
122 luminance acquisition unit
123 luminance correction unit
124 molding density estimation unit
125 defect determination unit
H internal defect
P metal powder
W additive product

What is claimed is:

1. A quality estimation device for an additive product comprising:
an imaging device configured to illuminate a region including a molding surface during manufacturing of the additive product and image the region, when manufacturing the additive product at a molding position by irradiating with a light beam and a material powder melting and solidifying;

a luminance acquisition unit acquires a luminance obtained by quantifying a brightness of a light reflected by at least the molding surface of the region in an image in which the imaging device images the region; and a molding density estimation unit estimates a molding density indicating a density of the material powder in a solidified state after melting based on the luminance of the molding surface acquired by the luminance acquisition unit, wherein the material powder is supplied to the molding position.

2. The quality estimation device for the additive product according to claim 1, further comprising:

a luminance correction unit corrects the luminance of the molding surface acquired by the luminance acquisition unit, wherein the molding density estimation unit estimates the molding density based on the luminance of the molding surface corrected by the luminance correction unit.

3. The quality estimation device for the additive product according to claim 2, wherein the imaging device comprises:
an illumination unit configured to illuminate the region from a predetermined direction, and
an imaging unit configured to image the region illuminated by the illumination unit, and wherein the luminance correction unit corrects the luminance in accordance with a scanning direction of the light beam on the molding surface with respect to the predetermined direction in which the illumination unit illuminates the area.

4. The quality estimation device for the additive product according to claim 3, wherein the scanning direction of the light beam is changed for each of adjacent additive layers in the additive product.

5. The quality estimation device for the additive product according to claim 2, wherein the luminance correction unit corrects peripheral luminance of a peripheral region other than the molding surface in the region to a preset reference luminance.

6. The quality estimation device for the additive product according to claim 1, wherein the luminance of the molding surface is a single layer average luminance which is an average of unit area luminance per unit area in the image.

7. The quality estimation device for the additive product according to claim 6, wherein the luminance of the molding surface is a multiple-layer average luminance obtained by averaging the single layer average luminances of the molding surfaces of a plurality of additive layers of the additive product.

8. The quality estimation device for the additive product according to claim 6, wherein the molding density estimation unit estimates the molding density based on a correlation represented by a multiple regression equation, and wherein the multiple regression equation includes the single layer average luminance and single layer standard deviation indicating variation in the unit area luminance in the single layer average luminance.

9. The quality estimation device for the additive product according to claim 7, wherein the molding density estimation unit estimates the molding density based on a correlation represented by a multiple regression equation, and wherein the multiple regression equation includes the multiple-layer average luminance and multiple-layer average standard deviation obtained by averaging a plurality of the single layer standard deviations indicating variation in the unit area luminance in the single layer average luminance.

10. The quality estimation device for the additive product according to claim 1, wherein the imaging device configured to image the region after the molding surface is molded and before the material powder is newly supplied to the molding position.

11. The quality estimation device for the additive product according to claim 1, further comprising:

a defect determination unit determining presence or absence of an internal defect which lowers a strength of the additive product as compared with that of a none-defective product, based on the molding density estimated by the molding density estimation unit.

12. The quality estimation device for the additive product according to claim 11, wherein the defect determination unit determines that the internal defect is present inside the additive product, when the molding density estimated by the molding density estimation unit is equal to or less than a preset reference molding density.

13. The quality estimation device for the additive product according to claim 11, wherein manufacturing of the additive product is stopped, when the defect determination unit determines that the internal defect is present inside the additive product.

14. The quality estimation device for the additive product according to claim 11, wherein the additive product in which the defect determination unit determines that the internal defect is present, is sorted as a defective product.

15. The quality estimation device for the additive product according to claim 1, wherein the material powder is aluminum or an alloy steel.

* * * * *